(12) United States Patent
Gonzalez Gonzalez et al.

(10) Patent No.: US 12,191,923 B2
(45) Date of Patent: Jan. 7, 2025

(54) RECONSTRUCTION METHOD OF DISCRETE DIGITAL SIGNALS IN NOISY OVERLOADED WIRELESS COMMUNICATION SYSTEMS

(71) Applicant: Continental Automotive Technologies GmbH, Hannover (DE)

(72) Inventors: David Gonzalez Gonzalez, Egelsbach (DE); Andreas Andrae, Frankfurt am Main (DE); Osvaldo Gonsa, Frankfurt (DE); Hiroki Iimori, Yokahama (JP); Giuseppe Thadeu Freitas de Abreu, Bremen (DE); Razvan-Andrei Stoica, Essen (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 17/916,672

(22) PCT Filed: Apr. 1, 2021

(86) PCT No.: PCT/EP2021/058582
§ 371 (c)(1),
(2) Date: Oct. 3, 2022

(87) PCT Pub. No.: WO2021/198407
PCT Pub. Date: Oct. 7, 2021

(65) Prior Publication Data
US 2023/0198811 A1      Jun. 22, 2023

(30) Foreign Application Priority Data

Apr. 3, 2020  (DE) .............. 10 2020 204 395.7
Apr. 3, 2020  (DE) .............. 10 2020 204 396.5
Apr. 3, 2020  (DE) .............. 10 2020 204 397.3

(51) Int. Cl.
*H04B 17/18*     (2015.01)
*H04B 1/12*      (2006.01)
(Continued)

(52) U.S. Cl.
CPC .............. *H04B 17/18* (2015.01); *H04B 1/12* (2013.01); *H04B 7/0626* (2013.01); *H04B 17/12* (2015.01);
(Continued)

(58) Field of Classification Search
CPC ........ H04B 1/12; H04B 7/0626; H04B 17/12; H04B 17/13; H04B 17/18; H04L 1/0039; H04L 25/21
See application file for complete search history.

(56) References Cited

U.S. PATENT DOCUMENTS 7,555,064 B2 * 6/2009 Beadle .................... H04L 1/206
                                                        375/316
8,488,711 B2 * 7/2013 Huang .............. H04L 25/03891
                                                        375/267
(Continued)

FOREIGN PATENT DOCUMENTS

CN        1841987 A      10/2006
CN      102176287 A       9/2011
(Continued)

OTHER PUBLICATIONS

Ryo Hayakawa et al. / Convex Optimization-Based Signal Detection for Massive Overloaded MIMO Systems. Nov. 9, 2017—IEEE Trans. Wireless Commun., vol. 16, No. 11, pp. 7080-7091.
(Continued)

*Primary Examiner* — Berhanu Tadese

(57) ABSTRACT

A computer-implemented reconstruction method of discrete digital signals in noisy overloaded wireless communication systems that is characterized by a channel matrix of complex
(Continued)

coefficients, the method including, receiving the signal from channel by a signal detector, measuring the noise power by a noise power estimator at the receiver, forwarding the detected signal and noise power estimation to a decoder that estimates the transmitted symbol, wherein the estimation of the decoder produces a symbol that could probably have been transmitted it is forwarded to a de-mapper, which outputs the bit estimates corresponding to the estimated transmit signal and the corresponding estimated symbol to a microprocessor for further processing.

14 Claims, 4 Drawing Sheets

(51) Int. Cl.
| | | |
|---|---|---|
| | H04B 7/06 | (2006.01) |
| | H04B 17/12 | (2015.01) |
| | H04B 17/13 | (2015.01) |
| | H04L 1/00 | (2006.01) |
| | H04L 25/02 | (2006.01) |

(52) U.S. Cl.
CPC ........... *H04B 17/13* (2015.01); *H04L 1/0039* (2013.01); *H04L 25/021* (2013.01)

(56) References Cited

U.S. PATENT DOCUMENTS

| | | | | |
|---|---|---|---|---|
| 8,699,592 | B1* | 4/2014 | Choi | H04L 25/0204 375/144 |
| 8,843,096 | B2* | 9/2014 | Becker | H04B 1/18 455/132 |
| 9,112,744 | B1* | 8/2015 | Venkatesh | H04L 25/0228 |
| 9,312,929 | B2* | 4/2016 | Forenza | H04B 7/01 |
| 9,344,303 | B1* | 5/2016 | Moshavi | H04L 25/03968 |
| 10,277,290 | B2* | 4/2019 | Forenza | H04B 7/024 |
| 10,349,417 | B2* | 7/2019 | Forenza | H04W 28/0236 |
| 10,425,134 | B2* | 9/2019 | Perlman | H04B 7/024 |
| 2004/0203427 | A1* | 10/2004 | Hill | H04B 17/16 455/67.11 |
| 2006/0227889 | A1* | 10/2006 | Uchida | H04W 52/42 375/347 |
| 2007/0127603 | A1* | 6/2007 | Niu | H03M 13/1102 375/347 |
| 2007/0275727 | A1* | 11/2007 | Lee | H04W 52/367 455/442 |
| 2008/0130719 | A1* | 6/2008 | Bottomley | H04B 1/712 375/E1.032 |
| 2008/0166975 | A1* | 7/2008 | Kim | H04W 52/241 455/68 |
| 2008/0279298 | A1* | 11/2008 | Ben-Yishai | H04L 25/03242 375/261 |
| 2009/0074050 | A1* | 3/2009 | Wang | H04L 25/03159 375/232 |
| 2009/0213944 | A1* | 8/2009 | Grant | H04B 1/712 375/260 |
| 2010/0194405 | A1* | 8/2010 | Yu | G01R 29/26 324/613 |
| 2011/0222638 | A1* | 9/2011 | Park | H04L 27/3863 375/346 |
| 2012/0045024 | A1* | 2/2012 | Cui | H04L 1/005 375/341 |
| 2012/0045995 | A1* | 2/2012 | Nakano | H04J 11/004 455/63.1 |
| 2013/0201947 | A1* | 8/2013 | Wong | H04W 52/42 370/329 |
| 2014/0082459 | A1* | 3/2014 | Li | G06F 11/1666 714/773 |
| 2016/0315791 | A1* | 10/2016 | Barbu | H04L 25/0202 |
| 2016/0344459 | A1* | 11/2016 | Chen | H04B 7/0868 |
| 2017/0102982 | A1* | 4/2017 | Kolandavelu | G05B 23/0248 |
| 2017/0346518 | A1* | 11/2017 | Lim | H04B 1/12 |
| 2018/0091261 | A1* | 3/2018 | Sayeed | H04L 25/0204 |
| 2018/0102882 | A1* | 4/2018 | Nakamura | H04W 52/0235 |
| 2018/0167175 | A1* | 6/2018 | Al-Dweik | H04L 25/0232 |
| 2018/0183650 | A1* | 6/2018 | Zhang | H04W 72/21 |
| 2018/0234948 | A1* | 8/2018 | Ren | H04W 72/04 |
| 2018/0248575 | A1* | 8/2018 | Bardin | H04B 1/16 |
| 2018/0278316 | A1* | 9/2018 | Yang | H04B 7/0617 |
| 2018/0279270 | A1* | 9/2018 | Sano | H04J 11/004 |
| 2018/0323846 | A1* | 11/2018 | Tsai | H04B 7/0617 |
| 2019/0199384 | A1* | 6/2019 | Pekoz | H04L 27/26412 |
| 2019/0222281 | A1* | 7/2019 | Sirotkin | H04W 76/27 |
| 2019/0229863 | A1* | 7/2019 | Lei | H04W 72/21 |
| 2019/0245646 | A1* | 8/2019 | Robert Safavi | H04L 27/3488 |
| 2020/0014473 | A1* | 1/2020 | Decurninge | H04B 7/0456 |
| 2021/0176008 | A1* | 6/2021 | Wang | H04B 17/336 |
| 2022/0417065 | A1* | 12/2022 | Gonzalez Gonzalez | H04L 5/0048 |
| 2023/0026867 | A1* | 1/2023 | Gonzalez Gonzalez | H04W 28/0284 |
| 2023/0144250 | A1* | 5/2023 | Gonzalez Gonzalez | H04B 17/18 455/115.1 |
| 2023/0171023 | A1* | 6/2023 | Gonzalez Gonzalez | H04B 17/12 370/252 |
| 2023/0198811 | A1* | 6/2023 | Gonzalez Gonzalez | H04B 17/18 375/262 |

FOREIGN PATENT DOCUMENTS

| | | | | |
|---|---|---|---|---|
| CN | 103119994 | A | 5/2013 | |
| CN | 102176287 | B * | 11/2013 | |
| CN | 103780293 | A | 5/2014 | |
| CN | 104601213 | A | 5/2015 | |
| CN | 104796239 | A * | 7/2015 | |
| CN | 105282060 | A | 1/2016 | |
| CN | 106411796 | A | 2/2017 | |
| CN | 106712903 | A | 5/2017 | |
| CN | 106817334 | A * | 6/2017 | ......... H04L 27/2623 |
| CN | 107483376 | A | 12/2017 | |
| CN | 107566059 | A | 1/2018 | |
| CN | 108173575 | A | 6/2018 | |
| CN | 109474388 | A | 3/2019 | |
| CN | 106411796 | B * | 7/2019 | |
| CN | 110071748 | A | 7/2019 | |
| CN | 106712903 | B * | 8/2019 | |
| CN | 110417515 | A * | 11/2019 | ........... H04B 7/0413 |
| CN | 106817334 | B * | 3/2020 | ......... H04L 27/2623 |
| CN | 109474388 | B * | 7/2021 | ........... H04B 7/0452 |
| CN | 114641972 | A * | 6/2022 | ....... H04L 25/03197 |
| CN | 115336208 | A * | 11/2022 | ............... H04B 1/12 |
| CN | 115336209 | A * | 11/2022 | ............... H04B 1/12 |
| CN | 115362645 | A * | 11/2022 | ............... H04B 1/12 |
| EP | 2830271 | A1 | 1/2015 | |
| EP | 2830271 | B1 * | 6/2018 | ........... H04B 7/0413 |
| EP | 3427389 | A1 | 1/2019 | |
| EP | 2483730 | B1 * | 11/2019 | ............... G01J 1/20 |
| EP | 2909939 | B1 * | 3/2021 | ......... G01R 27/2605 |
| EP | 3427389 | B1 * | 8/2021 | ............ H04W 52/10 |
| EP | 3353773 | B1 * | 1/2023 | ........... G10K 11/178 |
| JP | 2013522943 | A | 6/2013 | |
| JP | 2015056690 | A * | 3/2015 | |
| JP | 2017521885 | A * | 8/2017 | |
| KR | 20120125649 | A | 11/2012 | |
| KR | 20180091500 | A * | 8/2018 | |
| KR | 101918584 | B1 * | 11/2018 | |
| WO | WO-2010125760 | A1 * | 11/2010 | .......... H04J 11/0036 |
| WO | WO-2015186130 | A1 * | 12/2015 | ............. G06F 17/13 |
| WO | WO-2017057655 | A1 * | 4/2017 | ............... H04B 1/10 |
| WO | WO-2017057834 | A1 * | 4/2017 | ............ H04J 11/0046 |
| WO | WO-2017071540 | A1 * | 5/2017 | ............. H04L 1/00 |
| WO | WO-2017204469 | A1 * | 11/2017 | ............ H04W 74/08 |
| WO | WO-2018210256 | A1 * | 11/2018 | .......... H04J 11/0036 |
| WO | 2021083495 | A1 | 5/2021 | |
| WO | WO-2021099622 | A1 * | 5/2021 | ........... H04B 7/0456 |

(56) References Cited

FOREIGN PATENT DOCUMENTS

| | | | | |
|---|---|---|---|---|
| WO | WO-2021198404 | A1 | * 10/2021 | .............. H04B 1/12 |
| WO | WO-2021198406 | A1 | * 10/2021 | .............. H04B 1/12 |
| WO | WO-2021198407 | A1 | * 10/2021 | .............. H04B 1/12 |

OTHER PUBLICATIONS

Ryo Hayakawa, Kazunori Hayashi, Megumi Kaneko / An Overloaded MIMO Signal Detection Scheme with Slab Decoding and Lattice Reduction. Oct. 16, 2015.
De Mi, Mehrdad Dianati, Lei Zhang, Sami Muhaidat, Rahim Tafazolli / Massive MIMO Performance With Imperfect Channel Reciprocity and Channel Estimation Error. Sep. 1, 2017.
Chen Qian, Jingxian Wu, Yahong Rosa Zheng, Zhaocheng Wang / Two-Stage List Sphere Decoding for Under-Determined Multiple-Input Multiple-Output Systems. Dec. 2013.
Charles Jeon / Data Detection in Massive MU-MIMO Systems / Jan. 5, 2019.
Tianbin Wo and Peter Adam Hoeher / A Simple Iterative Gaussian Detector for Severely Delay-Spread MIMO Channels. Jun. 28, 2007.
Hiroki Iimori, Guiseppe Thadeu Freitas De Abreu, George C. Alexa / MIMO Beamforming Schemes for Hybrid SIC FD Radios With Imperfect Hardware and CSI. Oct. 9, 2019.
Tanumay Datta et al. / Low-Complexity Near-Optimal Signal Detection in Underdetermined Large-MIMO Systems. Feb. 5, 2012—in Proc. NCC, pp. 1-5.
D. Saffar, N. Boulejfen, F. Ghannouchi, M. Helaoui, A. Gharss / Behavioral Modeling of MIMO Transmitters Exhibiting Nonlinear Distortion and Hardware Impairements. Oct. 10, 2011.
G.D. Golden, C.J. Foschini, R.A. Valenzuela and P.W. Wolniansky / Detection algorithm and initial laboratory results using V-BLAST space-time communication architecture. Mar. 19, 2020.
Mahdi Barzegar Khalilsarai, Saeid Haghighatshoar et al. / FDD Massive MIMO via UL/DL Channel Covariance Extrapolation and Active Channel Sparsication. Jan. 1, 2019.
Mohamed A. Suliman, Ayed M. Alrashdi, Tarig Ballal et al. / SNR Estimation in Linear Systems with Gaussian Matrices. Dec. 1, 2017.
Hiroki Iimori et al. / Discreteness-aware Receivers for Overloaded MIMO Systems. Jan. 21, 2020, Submitted to IEEE TWC.
Abdeldjalil Aissa-El-Bey et al. / Sparsity-Based Recovery of Finite Alphabet Solutions to Underdetermined Linear Systems. Apr. 4, 2015—IEEE Trans. Inf. Theory, vol. 61, No. 4, pp. 2008-2018.
Qian Cheng, Dan Wang, Xiaona Li, Zhongfang Wang, Yongming Wang / Resource Allocation for Device-to-device Aided Cooperative NOMA with Imperfect CSI. Apr. 10, 2019.
Masaaki Nagahara / Discrete Signal Reconstruction by Sum of Absolute Values. Mar. 20, 2015.
Kaiming Shen, Wei Yu / Fractional Programming for Communication Systems—Part I: Power Control and Beamforming. Mar. 12, 2018.
Zahran Hajji, Abdeldjalil Aissa-El-Bey, Karine Amis / Simplicity-based recovery of finite-alphabet signals for large-scale MIMO systems. Jun. 9, 2018.
Tephen Boyd, Lieven Vandenberghe / Convex Optimization. (Chapter 3 Convex Functions) Mar. 2004.
Hwanjin Kim and Junil Choi / Channel Estimation for Spatially/Temporally Correlated Massive MIMO Systems with One-Bit ADCs. Dec. 9, 2019.
G. E. Prescott, J. L. Hammond, D. R. Hertling / Adaptive Estimation of Transmission Distortion in a Digital Communications Channel. Sep. 9, 1988.
Ryo Hayakawa et al. / Reconstruction of Complex Discrete-Valued Vector via Convex Optimization With Sparse Regularizers. Oct. 31, 2018.
Yasser Fadlallah et al. / New Iterative Detector of MIMO Transmission Using Sparse Decomposition. Sep. 29, 2014—IEEE Transactions on Vehicular Technology, vol. 64, No. 8, pp. 3458-3464.

Hiroki Iimori et al. / Joint Detection in Massive Overloaded Wireless System via Mixed-Norm Discrete Vector Decoding. Nov. 6, 2019—in Proc. Asilomar CSSC, Pacific Grove, USA.
Kai-Kit Wong, Arogyaswami Paulraj and Ross D. Murch / Efficient High-Performance Decoding for Overloaded MIMO Antenna Systems. May 21, 2007—vol. 6, No. 5, pp. 1833-1843.
Deng Chao, Zhao Xiaoya, Li Xingwang / Performance analysis of relaying networks based on non-orthogonal multiple access.
Yue Wu, Yuantao Gu and Zhaocheng Wang / Efficient Channel Estimation for mmWave MIMO with Transceiver Hardware Impairments.
Korean Office Action dated Aug. 31, 2023 of counterpart Korean Application 10-2022-7033311.
Korean Office Action dated Aug. 31, 2023 for related Korean Application 10-2022-7033312.
Korean Office Action dated Aug. 31, 2023 for related Korean Application 10-2022-7033310.
Notice of Allowance dated Sep. 5, 2023 of counterpart U.S. Appl. No. 17/916,640.
Chinese Office Action dated Aug. 18, 2023 of counterpart Chinese Application 202180025534.8.
Chinese Office Action dated Aug. 31, 2023 of counterpart Chinese Application 202180025535.2.
International Search Report dated Jul. 1, 2021 of International Application PCT/EP2021/058581 on which this application is based.
International Search Report dated Jul. 1, 2021 of counterpart International Application PCT/EP2021/058578.
International Search Report dated Jul. 7, 2021 of counterpart International Application PCT/EP2021/058582.
Limori Hiroki et al. "Design of Discretness-Aware Linear MMSE Filter", The 42nd Symposium on Information Theory and its Applications (SITA2019), 2019, pp. 581-586. Kirishima, Kagashima, Japan.
Hiroki Iimori et A. "Robust Transmit Beamforming Design via Fractional Programming for Downloads Power-Domain Noma Systems", IEICE Technical Report, IEEE, Jul. 3, 2019, vol. 119, No. 106, pp. 27-32.
Gan Yang "A novel Ultra-wideband weighted ATR receiver based on MMSE estimation for localization applications", Proceedings of the 2011 IEEE International Conference on Cyber Technology in Automation, Control, and Intelligent Systems Mar. 20-23, 2011, pp. 62-66, IEEE, Kunming, China.
Jiang Xiaolin "Multiuser Detection Algorithm in the Direction of Noise Enhanced Subspace in Massive MIMO Systems", Dissertation for the Master Degree in Engineering, China Academic Journal Electronic Publishing House, 2015.
Zhang Xianyu et al. "Ultra Wide-Band Channel Estimation and Signal Detection Through Compressed Sensing", Journal of Xi'an Jiaotong University, Vo. 44 No. 2, China Academic Journal Electronic Publishing House, 2010.
Office Action dated Sep. 12, 2023 from corresponding Chinese patent application No. 202180025498.5.
Office Action dated Oct. 24, 2023 from related Japanese patent application No. 2022-560345.
Office Action dated Oct. 24, 2023 from related Japanese patent application No. 2022-560336.
Office Action dated Oct. 19, 2023 from corresponding Japanese patent application No. 2022-560346.
Request for the Submission of an Opinion dated Aug. 31, 2023 for the counterpart Korean Patent Application No. 10-2022-7033312 and machine translation of same.
Request for the Submission of an Opinion dated Jun. 3, 2024 for the counterpart Korean Patent Application No. 10-2022-7033312 and machine translation of same.
El Gheche et al., "Proximal Splitting Methods for Depth Estimation", 2011 IEEE International Conference on Acoustics, Speech and Signal Processing (ICASSP), Date of Conference: May 22-27, 2011, DOI: 10.1109/ICASSP.2011.5946538.
Razvan-Andrei Stoica et al., "Massively Concurrent NOMA: A Frame-Theoretic Design for Non-Orthogonal Multiple Access", 2018 52nd Asilomar Conference on Signals, Systems, and Computers, Date of Conference: Oct. 28-31, 2018, DOI: 10.1109/ACSSC.2018.8645146.

(56) References Cited

OTHER PUBLICATIONS

Tanumay Datta et al., "Low-Complexity Near-Optimal Signal Detection in Underdetermined Large-MIMO Systems", 2012 National Conference on Communications (NCC), Date of Conference: Feb. 3-5, 2012, DOI: 10.1109/NCC.2012.6176823.
Razan-Andrei Stoica et al., "Sparsely-structured Multiuser Detection for Large Massively Concurrent NOMA Systems", 2019 53rd Asilomar Conference on Signals, Systems, and Computers, Date of Conference: Nov. 3-6, 2019, DOI: 10.1109/IEEECONF44664.2019.904877.
Yasser Fadlallah et al., "New Iterative Detector of MIMO Transmission Using Sparse Decomposition", IEEE Transactions on Vehicular Technology, vol. 64, Issue: 8, Aug. 2015, pp. 3458-3464, DOI: 10.1109/TVT.2014.2360687.
Patrick L. Combettes et al., "Proximal Splitting Methods in Signal Processing", May 18, 2010, arXiv:0912.3522 [math.OC].
Razan-Andrei Stoica et al., "A low-complexity Receiver for Massively Concurrent Non-orthogonal Multiple Access", 2019 IEEE 20th International Workshop on Signal Processing Advances in Wireless Communications (SPAWC), Date of Conference: Jul. 2-5, 2019, DOI: 10.1109/SPAWC.2019.8815592.
Takumi Takahashi et al, "Channel Estimation Using Long-term Channel Statistics for BP-based Large MIMO Detection", 2019, IEICE Technical Report, vol. 119, No. 8, pp. 76-72 and translation of same.
Zhang Mei, "Research on sparse multiuser detection strategy in Non-Orthogonal multiple access system", 2016 IEEE 27th Annual International Symposium on Personal, Indoor, and Mobile Radio Communications (PIMRC), Date of Conference: Sep. 4-8, 2016, DOI: 10.1109/PIMRC.2016.7794930.
Zhang Mei, "Research on sparse multiuser detection strategy in Non-Orthogonal multiple access system", 2016 IEEE 27th Annual International Symposium on Personal, Indoor, and Mobile Radio Communications (PIMRC), Date of Conference: Sep. 4-8, 2016, DOI: 10.1109/PIMRC.2016.7794930. English machine Translation.
R Hayakawa et al., "An overloaded MIMO signal detection scheme with slab decoding and lattice reduction", 2015 21st Asia-Pacific Conference on Communications (APCC), Date of Conference: Oct. 14-16, 2015, DOI: 10.1109/APCC.2015.7412549.
Zhao Xiaojuan et al., "Multi-user detection in NOMA system based on structured compressed sensing", 2018 and machine translation of same.
Razvan-Andrei Stoica et al., "Frame Theory and Fractional Programming for Sparse Recovery-Based mmWave Channel Estimation", IEEE Access, vol. 7, pp. 150757-150774, Date of Publication: Oct. 14, 2019.
Razvan-Andrei Stoica et al., "Massively Concurrent Non-Orthogonal Multiple Access for 5G Networks and Beyond", IEEE Access, vol. 7, pp. 82080-82100, Date of Publication: Jun. 19, 2019, DOI: 10.1109/ACCESS.2019.2923646.
Jin et al., "Resolution and Reconstruction of an Algorithm by a Modified Mobius Transformation in Signal Processing", 2009 Fifth International Joint Conference on INC, IMS and IDC, Date of Conference: Aug. 25-27, 2009, Date of Conference: Aug. 25-27, 2009, DOI: 10.1109/NCM.2009.317.
European Examination Report dated Nov. 5, 2024 for the counterpart European Patent Application No. 21 716 691.7.
European Examination Report dated Nov. 5, 2024 for the related European Patent Application No. 21 716 690.9.
European Examination Report dated Nov. 7, 2024 for the related European Patent Application No. 20 812 242.4.

\* cited by examiner

RECONSTRUCTION METHOD OF DISCRETE DIGITAL SIGNALS IN NOISY OVERLOADED WIRELESS COMMUNICATION SYSTEMS

FIELD

The present invention relates to the field of digital wireless systems in overloaded scenarios, addressing a problem of estimating symbols sampled from a discrete digital signaling alphabet (e.g., constellation) in noisy environments.

BACKGROUND

Since Shannon developed the Shannon-Weaver communication model, embedding informative bits into discrete alphabets (e.g., constellation, index, codebook) has been an indispensable feature of feasible signal processing systems. In response to the ever-larger demand for high-data-rate and because of the trend to operate wireless systems in higher frequency bands (for which transceivers employ larger numbers of antennas), such discrete-alphabet systems are rapidly scaling up, making large-dimensional discrete signal detection problems more relevant than ever before. Moreover, the rapid growth in the number of wirelessly-connected communication devices seen recently imply the necessity that receivers of future wireless systems can deal with underdetermined system conditions.

The expressions "resource overloading" or "overloaded communication channel" typically refers to a communication channel that is concurrently used by several users, or transmitters (T) whose number $N_T$ is larger than the number $N_R$ of receivers (R). At a receiver the multiplicity of transmitted signals will appear as one superimposed signal. The channel may also be overloaded by a single transmitter that transmits a superposition of symbols and thereby goes beyond the available channel resources in a "traditional" orthogonal transmission scheme. The "overloading" thus occurs in comparison to schemes, in which a single transmitter has exclusive access to the channel, e.g., during a time slot or the like, as found in orthogonal transmission schemes. Overloaded channels may be found, e.g., in wireless communication systems using Non-Orthogonal Multiple Access (NOMA) and underdetermined Multiple-Input Multiple-Output (MIMO) channels.

FIGS. 1 and 2 illustrate basic properties of orthogonal multiple access and non-orthogonal multiple access, respectively. FIG. 1 shows one exemplary embodiment of the ordered access of transmit resources to channels of a shared transmission medium, e.g., in a wireless communication system. The available frequency band is split into a number of channels. A single channel or a combination of contiguous or non-contiguous channels may be used by any one transmitter at a time. Different transmitters, indicated by the different hashing patterns, may transmit in discrete time slots or in several subsequent timeslots and may change the channels or combination of channels in which they transmit for each transmission. Note that, as shown in FIG. 1, any transmitter may use one channel resource over a longer period, while another transmitter may use two or more channel resources simultaneously, and yet another transmitter may to both, using two or more channel resources over a longer period. In any case, only one transmitter uses any channel resource or combination thereof at a time, and it is relatively easy to detect and decode signals from each transmitter.

FIG. 2a shows the same frequency band as shown in FIG. 1, but there may not always be a temporary exclusive assignment of one or more individual channels to a transmitter. Rather, at least a portion of the frequency band may concurrently be used by a plurality of transmitters, and it is much more difficult to detect and decode signals from individual transmitters. This is indicated by the boxes of different hashing. While, beginning from the left, at first three transmitters use temporary exclusive channel resources in an orthogonal manner, in the next moment two transmitters transmit in channels that partially overlap. The transmitter represented by the horizontal hashing pattern has exclusive access to the channel shown at the bottom of the figure, while the next three channels used by this transmitter are also used by another transmitter, represented by diagonal hashing pattern in the dashed-line oval. The superposition is indicated by the diagonally crossed hashing pattern. A similar situation occurs in the following moment, where each of two transmitters exclusively uses two channel resources, while both share a third one. It is to be noted that more than two transmitters may at least temporarily share some or all the channel resources each of them uses. These situations may be called partial-overloading, or partial-NOMA. In a different representation, FIG. 2b shows the same frequency band as FIG. 2. Since there is no clear temporary exclusive assignment of one or more individual channels to a transmitter, and at least a portion of the frequency band is at least temporarily concurrently used by a plurality of transmitters, the difficulty to detect and decode signals from individual transmitters is indicated by the grey filling pattern that does not allow for identifying any single transmitter.

C. Qian, J. Wu, Y. R. Zheng, and Z. Wang in "Two-stage list sphere decoding for under-determined multiple-input multiple-output systems," IEEE Transactions on Wireless Communication, vol. 12, no. 12, pp. 6476-6487, 2013 a two-stage list sphere decoding (LSD) algorithm is proposed for under-determined multiple-input multiple-output (UD-MIMO) systems that employ N transmit antennas and M<;N receive antennas. The two-stage LSD algorithm exploits the unique structure of UD-MIMO systems by dividing the N detection layers into two groups. Group 1 contains layers 1 to M that have similar structures as a symmetric MIMO system; while Group 2 contains layers M+1 to N that contribute to the rank deficiency of the channel Gram matrix. Tree search algorithms are used for both groups, but with different search radii. A new method is proposed to adaptively adjust the tree search radius of Group 2 based on the statistical properties of the received signals. The employment of the adaptive tree search can significantly reduce the computation complexity. We also propose a modified channel Gram matrix to combat the rank deficiency problem, and it provides better performance than the generalized Gram matrix used in the Generalized Sphere-Decoding (GSD) algorithm. Simulation results show that the proposed two-stage LSD algorithm can reduce the complexity by one to two orders of magnitude with less than 0.1 dB degradation in the Bit-Error-Rate (BER) performance. This reference will be used as reference [1] in this description of the application.

R. Hayakawa, K. Hayashi, and M. Kaneko in "An overloaded MIMO signal detection scheme with slab decoding and lattice reduction," Proceedings APCC, Kyoto, Japan, October 2015, pp. 1-5 proposes a reduced complexity signal detection scheme for overloaded MIMO (Multiple-Input Multiple-Output) systems. The proposed scheme firstly divides the transmitted signals into two parts, the post-voting vector containing the same number of signal elements as of receive antennas, and the pre-voting vector containing the remaining elements. Secondly, it uses slab decoding to reduce the solution candidates of the pre-voting vector and determines the post-voting vectors for each pre-voting vector candidate by lattice reduction aided MMSE (Minimum Mean Square Error)-SIC (Successive Interference Cancellation) detection. Simulation results show that the proposed scheme can achieve almost the same performance as the optimal ML (Maximum Likelihood) detection while drastically reducing the required computational complexity. This reference will be used as reference [2] in this description of the application.

T. Datta, N. Srinidhi, A. Chockalingam, and B. S. Rajan, "Low complexity near-optimal signal detection in underdetermined large MIMO systems," in Proc. NCC, February 2012, pp. 1-5 is considered signal detection in $n_t$ x $n_r$ underdetermined MIMO (UD-MIMO) systems, where i) $n_t > n_r$ with a overload factor $\alpha = n_t n_r > 1$, ii) $n_t$ symbols are transmitted per channel use through spatial multiplexing, and iii) $n_t$, $n_r$ are large (in the range of tens). A low-complexity detection algorithm based on reactive tabu search is considered. A variable threshold based stopping criterion is proposed which offers near-optimal performance in large UD-MIMO systems at low complexities. A lower bound on the maximum likelihood (ML) bit error performance of large UD-MIMO systems is also obtained for comparison. The proposed algorithm is shown to achieve BER performance close to the ML lower bound within 0.6 dB at an uncoded BER of 10-2 in 16×8 V-BLAST UD-MIMO system with 4-QAM (32 bps/Hz). Similar near-ML performance results are shown for 32×16, 32×24 V-BLAST UD-MIMO with 4-QAM/16-QAM as well. A performance and complexity comparison between the proposed algorithm and the λ-generalized sphere decoder (λ-GSD) algorithm for UD-MIMO shows that the proposed algorithm achieves almost the same performance of λ-GSD but at a significantly lesser complexity. This reference will be used as reference [3] in this description of the application.

Y. Fadlallah, A. Aissa-El-Bey, K. Amis, D. Pastor and R. Pyndiah, "New Iterative Detector of MIMO Transmission Using Sparse Decomposition," IEEE Transactions on Vehicular Technology, vol. 64, no. 8, pp. 3458-3464, August 2015 addresses the problem of decoding in large-scale multiple-input-multiple-output (MIMO) systems. In this case, the optimal maximum-likelihood (ML) detector becomes impractical due to an exponential increase in the complexity with the signal and the constellation dimensions. This paper introduces an iterative decoding strategy with a tolerable complexity order. It is consider a MIMO system with finite constellation and model it as a system with sparse signal sources. It is propose an ML relaxed detector that minimizes the Euclidean distance with the received signal while preserving a constant 1-norm of the decoded signal. It is also showed that the detection problem is equivalent to a convex optimization problem, which is solvable in polynomial time. This reference will be used as reference [4] in this description of the application.

T. Wo and P. A. Hoeher, "A simple iterative gaussian detector for severely delay-spread MIMO channels," in Proc. IEEE ICC, Glasgow, U K, 2007 describe in this paper, a low-complexity high-performance detection algorithm for multiple input multiple output (MIMO) channels with severe delay spread is proposed. This algorithm performs iterative data detection over factor graphs which apply an independence approximation as well as a Gaussian approximation. It is shown that this algorithm achieves a near-optimum BER performance for coded MIMO systems with severe delay spread. The computational complexity of this algorithm is strictly linear in the number of transmit antennas, the number of receive antennas, and the number of non-zero channel coefficients. This reference will be used as reference [5] in this description of the application.

A. Aissa-El-Bey, D. Pastor, S. M. A. Sbaï, and Y. Fadlallah, "Sparsity-based recovery of finite alphabet solutions to underdetermined linear systems," IEEE Trans. Inf. Theory, vol. 61, no. 4, pp. 2008-2018, April 2015 describe the problem of estimating a deterministic finite alphabet vector f from underdetermined measurements y=Af, where A is a given (random) n×N matrix is described. Two convex optimization methods are introduced for the recovery of finite alphabet signals via 1-norm minimization. The first method is based on regularization. In the second approach, the problem is formulated as the recovery of sparse signals after a suitable sparse transform. The regularization based method is less complex than the transform-based one. When the alphabet size p equals 2 and (n, N) grows proportionally, the conditions under which the signal will be recovered with high probability are the same for the two methods. When p>2, the behavior of the transform-based method is established. This reference will be used as reference [6] in this description of the application.

M. Nagahara, "Discrete signal reconstruction by sum of absolute values," IEEE Signal Process. Lett., vol. 22, no. 10, pp. 1575-1579, October 2015 it is considered a problem of reconstructing an unknown discrete signal taking values in a finite alphabet from incomplete linear measurements. The difficulty of this problem is that the computational complexity of the reconstruction is exponential as it is. To overcome this difficulty, it is extend the idea of compressed sensing, and propose to solve the problem by minimizing the sum of weighted absolute values. It is assume that the probability distribution defined on an alphabet is known, and formulate the reconstruction problem as linear programming. Examples are shown to illustrate that the proposed method is effective. This reference will be used as reference [7] in this description of the application.

R. Hayakawa and K. Hayashi, "Convex optimization-based signal detection for massive overloaded MIMO systems," IEEE Trans. Wireless Commun., vol. 16, no. 11, pp. 7080-7091, November 2017 proposes signal detection schemes for massive multiple-input multiple-output (MIMO) systems, where the number of receive antennas is less than that of transmitted streams. Assuming practical baseband digital modulation, and taking advantage of the discreteness of transmitted symbols, it is formulated the signal detection problem as a convex optimization problem, called sum-of-absolute-value (SOAV) optimization. Moreover, we extend the SOAV optimization into the weighted-SOAV (W-SOAV) optimization and propose an iterative approach to solve the W-SOAV optimization with updating the weights in the objective function. Furthermore, for coded MIMO systems, we also propose a joint detection and decoding scheme, where log likelihood ratios (LLRs) of transmitted symbols are iteratively updated between the MIMO detector and the channel decoder. In addition, a theoretical performance analysis is provided in terms of the upper bound of the size of the estimation error obtained with the W-SOAV optimization. Simulation results show that the bit error rate (BER) performance of the proposed scheme is better than that of conventional schemes, especially in large-scale overloaded MIMO systems. This reference will be used as reference [8] in this description of the application.

R. Hayakawa and K. Hayashi, "Reconstruction of complex discrete-valued vector via convex optimization with sparse regularizers," IEEE Access, vol. 6, pp. 66 499-66 512, October 2018 proposes signal detection schemes for massive multiple-input multiple-output (MIMO) systems, where the number of receive antennas is less than that of transmitted streams. Assuming practical baseband digital modulation and taking advantage of the discreteness of transmitted symbols, the signal detection problem is formulated as a convex optimization problem, called sum-of-absolute-value (SOAV) optimization. Moreover, extend the SOAV optimization into the weighted SOAV (W-SOAV) optimization is extended and propose an iterative approach to solve the W-SOAV optimization with updating the weights in the objective function. Furthermore, for coded MIMO systems, a joint detection and decoding scheme is proposed, where log likelihood ratios of transmitted symbols are iteratively updated between the MIMO detector and the channel decoder. In addition, a theoretical performance analysis is provided in terms of the upper bound of the size of the estimation error obtained with the W-SOAV optimization. This reference will be used as reference [9] in this description of the application.

Z. Hajji, A. Aissa-El-Bey, and K. A. Cavalec, "Simplicity-based recovery of finite-alphabet signals for large-scale MIMO systems," Digital Signal Process., vol. 80, pp. 70-82, 2018 in this paper, the problem of finite-alphabet source separation in both determined and underdetermined large-scale systems is considered. First, we address the noiseless case and we propose a linear criterion based on $l_1$-minimization combined with box constraints. We investigate also the system conditions that ensure successful recovery. Next, we apply the approach to the noisy massive MIMO transmission and we propose a quadratic criterion-based detector. Simulation results show the efficiency of the proposed detection methods for various QAM modulations and MIMO configurations. We mention that there is no change in the computational complexity when the constellation size increases. Moreover, the proposed method outperforms the classical Minimum Mean Square Error (MMSE)-based detection algorithms. This reference will be used as reference [10] in this description of the application.

H. Iimori, G. Abreu, D. Gonzaléz G., and O. Gonsa, "Joint detection in massive overloaded wireless systems via mixed-norm discrete vector decoding," in Proc. Asilomar CSSC, Pacific Grove, USA, 2019 propose a novel '$l_0$-norm based multi dimensional signal detection scheme for overloaded wireless systems such as Non-orthogonal Multiple Access (NOMA) and underdetermined Multiple-Input Multiple-Output (MIMO), in which the discreteness of maximum likelihood (ML) detection is transformed into a continuous $l_0$-norm constraint, subsequently convexized via fractional programming (FP). As a consequence, the proposed signal detection algorithm possesses the potential to achieve ML-like performance in terms of bit error rate (BER) by properly adjusting weighting parameters, at a fraction of the cost. Simulation comparisons with state-of-the-art (SotA) alternatives are given, which illustrate the effectiveness of the proposed method both in terms of its capability of outperforming the SotA and of possibilities of further improvement towards ML-like performance via the optimization of the weighting parameters. This reference will be used as reference [11] in this description of the application.

H. Iimori, R.-A. Stoica, G. T. F. de Abreu, D. Gonzaléz G., A. Andrae, and O. Gonsa, "Discreteness-aware receivers for overloaded MIMO systems," CoRR, vol. abs/2001.07560, 2020. [Online]. Available: https://arxiv.org/abs/2001.07560 describe three high-performance receivers suitable for symbol detection of large-scaled and overloaded multidimensional wireless communication systems, which are designed upon the usual perfect channel state information (CSI) assumption at the receiver. Using this common assumption, the maximum likelihood (ML) detection problem is first formulated in terms of an '0-norm-based optimization problem, subsequently transformed using a recently-proposed fractional programming (FP) technique referred to as quadratic transform (QT), in which the $l_0$-norm is not relaxed into an $l_1$-norm, in three distinct ways so as to offer a different performance-complexity tradeoff. The first algorithm, dubbed the discreteness-aware penalized zero-forcing (DAPZF) receiver, aims at outperforming state-of-thearts (SotAs) while minimizing the computational complexity. The second solution, referred to as the discreteness-aware probabilistic soft-quantization detector (DAPSD), is designed to improve the recovery performance via a soft-quantization method, and is found via numerical simulations to achieve the best performance of the three. Finally, the third scheme, named the discretenessaware generalized eigenvalue detector (DAGED), not only offers a trade-off between performance and complexity compared to the others, but also differs from them by not requiring a penalization parameter to be optimized offline. Simulation results demonstrate that all three methods outperform the state-of-the-art receivers, with the DAPZF exhibiting significantly lower complexity. This reference will be used as reference [12] in this description of the application.

Boyd, S., & Vandenberghe, L. (2004). Convex Optimization. Cambridge: Cambridge University Press. doi: 10.1017/CBO9780511804441 describes the theoretical basis for the convex optimization as a lecture book. This reference will be used as reference [13] in this description of the application.

K. Shen and W. Yu in "Fractional programming for communication systems—Part I: Power control and beamforming," IEEE Trans. Signal Process., vol. 66, no. 10, pp. 2616-2630, May 2018 explores the use of FP in the design and optimization of communication systems. Part I of this paper focuses on FP theory and on solving continuous problems. The main theoretical contribution is a novel quadratic transform technique for tackling the multiple-ratio concave-convex FP problem—in contrast to conventional FP techniques that mostly can only deal with the single-ratio or the max-min-ratio case. Multiple-ratio FP problems are important for the optimization of communication networks, because system-level design often involves multiple signal-to-interference-plus-noise ratio terms. This paper considers the applications of FP to solving continuous problems in communication system design, particularly for power control, beamforming, and energy efficiency maximization. These application cases illustrate that the proposed quadratic transform can greatly facilitate the optimization involving ratios by recasting the original nonconvex problem as a sequence of convex problems. This FP-based problem reformulation gives rise to an efficient iterative optimization algorithm with provable convergence to a stationary point. This reference will be used as reference [14] in this description of the application.

Kai-Kit Wong, Member and Arogyaswami Paulraj in "Efficient High-Performance Decoding for Overloaded MIMO Antenna Systems" IEEE TRANSACTIONS ON WIRELESS COMMUNICATIONS, VOL. 6, NO. 5, May 2007 describe that, the practical challenge of capacity-achieving forward error-correcting codes (e.g., space-time Turbo codes) is overcoming the tremendous complexity associated by their optimal joint maximum-likelihood (ML) decoding. For this reason, iterative soft decoding has been studied to approach the optimal ML decoding performance at affordable complexity. In multipleinput multiple-output (MIMO) channels, a judicious decoding strategy consists of two stages: 1) estimate the soft bits using list version of sphere decoding or its variants, and 2) update the soft bits through iterative soft decoding. A MIMO decoder is required to produce reliable soft-bit estimates at the first stage before iterative soft decoding is performed. In this paper, the focus is on the overloaded (or fat) MIMO antenna systems where the number of receive antennas is less than the number of signals multiplexed in the spatial domain. In this scenario, the original form of sphere decoding is inherently not applicable and our aim is to generalize sphere decoding geometrically to cope with overloaded detection. The so-called slab-sphere decoding (SSD) proposed guarantees to obtain exactML hard detection while reducing complexity greatly. With the list-version of SSD, this paper proposes an efficient MIMO soft decoder, which can generate reliable soft-bit estimates at affordable complexity as inputs for iterative soft decoding for promising performance. This reference will be used as reference [15] in this description of the application.

G. D. Golden, C. J. Foschini, R. A. Valenzuela and P. W. Wolniansky in "Detection algorithm and initial laboratory results using V-BLAST space-time communication architecture" ELECTRONICS LETTERS 7th January 7999 Vol. 35 No. I the signal detection algorithm of the vertical BLAST (Bell Laboratories Layered Space-Time) wireless communications architecture is described. Using this joint space-time approach, spectral efficiencies ranging from 20-40 bit/s/Hz have been demonstrated in the laboratoly under flat fading conditions at indoor fading rates. Recent information theory research has shown that the rich-scattering wireless channel is capable of enormous theoretical capacities if the multipath is properly exploited. The diagonally-layered space-time architecture proposed by Foschini, now known as D-BLAST, uses multielement antenna arrays at both transmitter and receiver and an elegant diagonally-layered coding structure in which code blocks are dispersed across diagonals in space-time. In an independent Rayleigh scattering environment, this processing structure leads to theoretical rates which grow linearly with the number of transmit antennas, with these rates approaching 90% of Shannon capacity. However, the diagonal approach suffers from certain implementation complexities which make it inappropriate for initial implementation. It is described a simplified version of the BLAST detection algorithm, known as vertical BLAST, or V-BLAST, which has been implemented in realtime in the laboratory. Using our laboratory prototype, we have demonstrated spectral efficiencies as high as 40 bit/s/Hz in an indoor slow-fading environment. This reference will be used as reference [16] in this description of the application.

Multidimensional discrete signal detection problems also arise in various areas of modern electrical engineering related to signal processing, including audio and video systems, communication systems, control systems and more. In general, the aim is to extract out of a limited number of observed measurements of a signal subjected to random distortion, noise and interference, informative quantities (symbols) which albeit random (unknown), are generated from sources according to a systematic model (coding book, constellation, etc.) known to the receiver.

One of the principal issues of such large and possibly underdetermined systems is performance-complexity tradeoff. Indeed, on the one hand the ML receiver and its classic near-optimal alternatives such as sphere decoders [1,2] suffer from prohibitive computational complexity which grow exponentially with the number of input variables and the cardinality of the source's constellation, causing combinatorial formulations of the problem to become intractable even for relatively small settings. On the other hand, conventional low-complexity linear estimators (i.e., zero-forcing (ZF) and minimum mean square error (MMSE)) are associated with severe bit error rate (BER) performance degradation in underdetermined cases. Although several low-complexity counterparts have been proposed in the past [3-5], one can find their limitations on either scalability due to relatively high computational complexity or performance due to moderate detection capability.

Recently, much progress has been made in this area thanks to the introduction of compressed sensing (CS) methods, which in the context of multidimensional discrete signal detection lead to a novel finite-alphabet signal regularization technique solvable in polynomial time, which is proposed by [6,7]. To elaborate, the core idea of this new concept, referred to as discreteness-awareness, is to bias the search of likely signals towards the discrete constellation set using techniques which emerged recently out of CS methods, while maintaining the continuity of the search space so as to retain convexity and thus allow for optimum solutions to be obtained efficiently.

In this context, discreteness-aware receiver designs have been pursued in several recent articles. In [6,7], for instance, new sparsity-based recovery methods for noise free underdetermined linear systems has been proposed, which demonstrates the feasibility of discrete signal recovery even in severely overloaded massive systems.

In order to take into account the effect of the noise on decoding performance at the receiver [8-10] have developed novel discreteness-aware receivers, dubbed as sum-of-absolute-value (SOAV), sum of complex sparse regularizers (SCSR) and simplicity-based recovery (SBR), respectively, which have been shown to significantly outperform not only the conventional linear ZF and MMSE estimators but also previous state-of-the-arts (SotAs) including the graph-based iterative Gaussian detector (GIGD) [5], the Quad-min [4] and the enhanced reactive Tabu search (ERTS) [3]. However, the latter approaches have relied on the well-known $l_1$-norm approximation to replace the $l_0$-norm non-convex function appeared in the original discreteness-aware receiver so as to capture the discreteness of the input signal, indicating the possibility to improve the detection performance.

Aiming to tackle this challenge, the authors in [11, 12] have developed a new type of discreteness-aware receivers without resorting to the usual convex hull relaxation, which have demonstrated that the proposed methods not only outperform the other SotAs (i.e., SOAV, SCSR and SBR) but also approach the theoretical performance bound. Their key ingredients are two-fold: the adaptable $l_0$-norm approximation and fractional programming (FP), which cast the intractable $l_0$-norm minimization into sequence of convex problems, tightening the approximation gap.

Although it has been shown in [12] that the new discreteness-aware receiver, referred to as discreteness-aware penalized zero-forcing (DAPZF), significantly outperformed other SotA discreteness-aware detectors, i.e., SOAV, SCSR and SBR referred above, which indicates that DAPZF is novelty resulting in better performance, DAPZF, as well as other SotAs, have not fully taken into account effect of the noise at the receiver when designing their detection process.

In other words, none of the previous discreteness-aware detection algorithms have taken advantage of some well-known behaviors of the noise (e.g., variance) to avoid possible noise amplification that is well-known to lead to performance degradation, leaving potential for further improvements.

Thus, the present invention addresses the noise-problem, that of to provide a method for estimating transmit discrete symbol vectors under noisy environments, particularly in overloaded communication channels.

BRIEF SUMMARY

The invention recognizes that, since the symbols used in digital communications are ultimately transmitted as analogue signals in the analogue, i.e., continuous domain, and attenuation, intermodulation, distortion and all kinds of errors are unavoidably modifying the signals on their way from the transmitter through the analogue communication channel to the receiver, the "detection" of the transmitted symbol in the receiver remains foremost an "estimation" of the transmitted signal, irrespective of the method used. Signals are in most of cases represented by signal amplitude and signal phase for the estimation of the transmitted signal's vector. However, in the context of the present specification the terms "detecting" and "estimating" are used interchangeably, unless a distinction therebetween is indicated by the respective context. Once estimated transmitted signals are determined it is translated into an estimated transmitted symbol, and ultimately provided to a decoder that maps the estimated transmitted symbol to transmitted data bits.

All patent applications and patents mentioned in this disclosure are hereby incorporated by reference in their entireties:
PCT/EP2019/079532 with the title "Method of estimating transmit Symbol Vectors in an overloaded Communication Channel".
PCT/EP2020/082987 with the title "Method for Wireless X2X Access and Receivers for Large Multidimensional Wireless Systems".

All publications disclosed herein are incorporated by reference in their entireties, including:
H. Iimori, G. Abreu, D. Gonzaleź G., and O. Gonsa, "Joint detection in massive overloaded wireless systems via mixed-norm discrete vector decoding," in Proc. Asilomar CSSC, Pacific Grove, USA, as reference [11]
H. Iimori, R.-A. Stoica, G. T. F. de Abreu, D. Gonzaléz G., A. Andrae, and O. Gonsa, "Discreteness-aware receivers for overloaded MIMO systems," CoRR, vol. abs/ 2001.07560, 2020, as reference [12]
Mohamed A. Suliman, Ayed M. Alrashdi, Tarig Ballal, and Tareq Y. Al-Naffour "SNR Estimation in Linear Systems with Gaussian Matrices". Available: 1708.01466.pdf (arxiv.org). This article describes a modern mechanism to estimate SNR using random matrix theory. Under the assumption that the signal's power is known (pilots), noise power can be estimated.
G. E. Prescott, J. L. Hammond and D. R. Hertling, "Adaptive estimation of transmission distortion in a digital communications channel," in IEEE Transactions on Communications, vol. 36, no. 9, pp. 1070-1073, September 1988, doi: 10.1109/26.7519.

In the context of the present specification and claims, a communication channel is characterized by a set or matrix of complex coefficients. The channel matrix may also be referred to by the capital letter H. The communication channel may be established in any suitable medium, e.g., a medium that carries electromagnetic, acoustic and/or light waves. It is assumed that the channel properties are known and constant during each symbol transmission period/time, i.e., while the channel properties may vary over time, each symbol's transmission experiences a constant channel.

The expression "symbol" refers to a member of a set of discrete symbols $c_i$, which form a constellation C of symbols or, more profane, an alphabet that is used for composing a transmission. A symbol represents one or more bits of data and represents the minimum amount of information that can be transmitted at a time in the system using constellation C. In the transmission channel a symbol may be represented by a combination of analogue states, e.g., an amplitude and a phase of a carrier wave. Amplitude and phase may, e.g., be referred to as a complex number or as ordinate values over an abscissa in the cartesian space and may be treated as a vector. A symbol's vector is referred to herein by the small letter s. Each transmitter may use the same constellation (C) for transmitting data. However, it is likewise possible that the transmitters use different constellations. It is assumed that the receiver has knowledge about the constellations used in the respective transmitters.

A convex function is a function [13] on which any two points on the function can be connected by a straight line that entirely stays above the function itself. The convex domain may have any dimensionality, and the inventors recognize that the idea of a straight line in a 4-or-more-dimensional domain may be difficult to visualize.

The terms "component" or "element" may be used synonymously throughout the following specification, notably when referring to vectors.

Motivated by all the above, we provide the theoretical base of the inventive detection scheme that fully incorporates the noise effect into its signal detection procedure, thus outperforming the SotAs in terms of discrete signal detection performance.

Consider a unidirectional communication link under a (possibly under) determined scenarios, which is modeled as $$y=Hs+n \quad (1)$$

where $N_t$ and $N_r$ are respectively the dimensions of the input and the output signals, such that the overloading ratio of the system is given by $$\gamma = \frac{N_t}{N_r}.$$

In the above, $H \in \mathbb{C}^{N_r \times N_t}$ is a measurement matrix between the input and the output, assumed to be perfectly known at the receiver, a normalized input symbol vector consisting of elements sampled from the same constellation set $\mathcal{C} = \{c_1 \cdots c_{2^b}\}$ of cardinality $2^b$ is described as $s=[s_1 \cdots s_{N_t}]^T \in \mathbb{C}^{N_t \times 1}$ with b denoting the number of bits per symbol, and finally $n \in \mathbb{C}^{N_r \times 1}$ represents an independent and identically distributed (i.i.d.) circular symmetric complex AWGN vector with zero mean and covariance matrix $N_t/\Sigma I_{N_r}$, where $\rho$ is the fundamental signal-to-noise-ratio (SNR). SNR indicates the power ratio of the desired/transmitted signal with respect to the noise. As it is shown in FIG. 3, $\rho$ (noise variance/power) is periodically sampled by signal detector 212 and passed to signal decoder 214. This additional step is captured into the mathematical/optimization formulation as it can be seen in Eq. (4).

Given equation (1), the corresponding ML detection can be readily expressed as follows.

$$\underset{s \in C^{N_t}}{\operatorname{argmin}} \|y - Hs\|_2^2 \quad (2)$$

$$\text{s.t. } s \in C^{N_t},$$

which can be rewritten as $$\underset{s \in C^{N_T}}{\operatorname{argmin}} \|y - Hs\|_2^2 \text{ s.t. } \sum_{i=1}^{2^b} \|s - c_i 1\|_0 = N_T \cdot (2^b - 1). \quad (3)$$

In conventional detectors a ML detection may be used for estimating a transmit signal vector for a received signal y. The ML detection requires determining the distances between the received signal vector y and each of the symbol vectors s of the symbols $c_i$ of the constellation C. The number of calculations exponentially increases with the number $N_t$ of transmitters T.

First, recognize that the regularizing constraint in equation (3) is satisfied if and only if the solution s E C. However, the constraint is disjoint since it can only be verified by testing all distinct combinations of the elements of C in s, making the problem intractable in realistic massive wireless systems. As an alternative, equation (3) can be written in the form of a regularized unconstrained minimization problem, i.e.

$$\underset{s \in C^{N_t}}{\operatorname{argmin}} \|y - Hs\|_2^2 + \frac{N_t}{\rho} \|s\|_2^2 + \lambda \sum_{i=1}^{2^b} \|s - c_i 1\|_0, \quad (4)$$

for some penalty parameter $\lambda > 0$ and where the term was introduced in order to avoid noise amplification caused by ill-conditioning of H, which can be recognized as the noise-aware receiver design.

The meaning of Eq. 4, particularly the $2^{nd}$ term which has been added to the optimization formulation, can be viewed as a measure to avoid noise amplification.

Considering that s is the optimization variable, s is selected in that manner, that s directly minimizes the effect of the noise (in EQ 4 is represented by $N_t/\rho$), which now appears explicitly, particularly when it is large, thus creating robustness to noise.

Aiming to tackle intractable non-convexity of the $l_0$-norm in the ML-like formulation given in equation (4), we introduce the following adaptive $l_0$-norm approximation $$\|x\|_0 \approx \sum_{j=1}^{N} \frac{|x_j|^2}{|x_j|^2 + \alpha} = N - \sum_{j=1}^{N} \frac{\alpha}{|x_j|^2 + \alpha}, \quad (5)$$

where x denotes an arbitrary sparse vector of length N and $\alpha > 0$ is a free-choice parameter, whose magnitude controls the tightness of the approximation.

Substituting (5) into (4) and taking into account a priori knowledge corresponding to each element of s yield $$\underset{s \in C^{N_t}}{\operatorname{argmin}} \|y - Hs\|_2^2 + \frac{N_t}{\rho} \|s\|_2^2 + \lambda \sum_{i=1}^{2^b} \sum_{j=1}^{N_t} \frac{w_{i,j} \alpha}{|s_j - c_i|^2 + \alpha}, \quad (6)$$

where $w_{i,j}$ denotes a likelihood estimate corresponding to the probability that $s_j$ coincides with $c_i$, and $\Sigma_{i=1}^{2^b} w_{i,j}$.

At this point we highlight that the objective in equation (6) is a non-convex sum-of-ratios function, which can be convexized via a technique referred to as the quadratic transform (QT) in fractional programming theory, as has been shown by [14]. Considering the QT, the penalized unconstrained minimization problem given in equation (6) can be further rewritten as $$\underset{s \in C^{N_t}}{\operatorname{argmin}} \|y - Hs\|_2^2 + \frac{N_t}{\rho} \|s\|_2^2 + \lambda(s^H B s - 2\operatorname{Re}\{b^H s\}) \quad (7)$$

where $$b \triangleq \sum_{i=1}^{2^b} c_i [w_{i,1} \beta_{i,1}^2, w_{i,2} \beta_{i,2}^2, \ldots, w_{i,N} \beta_{i,N}^2]^T$$

$$B \triangleq \sum_{i=1}^{2^b} \operatorname{diag}(w_{i,1} \beta_{i,1}^2, w_{i,2} \beta_{i,2}^2, \ldots, w_{i,N} \beta_{i,N}^2) \succeq 0$$

$$\text{and } \beta_{i,j} = \frac{\sqrt{\alpha}}{|s_j - c_i|^2 + \alpha}.$$

After some trivial algebra, the expression in equation (7) can be brought to $$\underset{s \in C^N}{\operatorname{argmin}} \underbrace{s^H \left( H^H H + \frac{N}{\rho} I_N + \lambda B \right) s - 2\operatorname{Re}\{(H^H y + \lambda b)^H s\}}_{\triangleq f(s)} \quad (8)$$

One may notice that the objective of the problem in equation (8) is a convex quadratic function of s, from which we obtain by setting the Wirtinger derivative equal to zero, $$\hat{s} = \underbrace{\left( H^H H + \frac{N}{\rho} I_N + \lambda B \right)^{-1}}_{\triangleq \Psi} \underbrace{(H^H y + \lambda b)}_{\triangleq \psi}. \quad (9)$$

Note that by setting $\lambda = 0$, equation (9) reduces to the well-known standard LMMSE filter for multidimensional receiver, which therefore can be seen as a particular case of the algorithm here presented. On the other hand, as can be seen from equation (4), an increasing $\lambda > 0$ acts to emphasize that the solution is such that all elements of s to belong to the discrete set C, with the "pressure" of that enforcement inversely proportional to the magnitude of a. Due to this feature, we refer to the proposed method as the discreteness-aware LMMSE estimator.

Thus, a computer-implemented method in accordance with the present invention of estimating transmit symbol vectors transmitted in an overloaded communication channel that is characterized by a channel matrix H of complex coefficients includes receiving, in a receiver R, a signal represented by a received signal vector y. The received signal vector y corresponds to a superposition of signals representing transmitted symbol vectors s selected from a constellation C of symbols $c_i$ that are transmitted from one or more transmitters T, plus any distortion and noise added by the channel.

In case of more than one transmitter the transmitters T are temporally synchronized, i.e., a common time base is assumed between the transmitters T and the receiver R, such that the receiver R receives transmissions of symbols from different transmitters T substantially simultaneously, e.g., within a predetermined time window. The symbols being received simultaneously or within a predetermined time window means that all temporally synchronized transmitted symbols are received at the receiver R before subsequent symbols are received, assuming that a transmitter T transmits a sequence of symbols one by one. This may include settings in which transmitters T adjust the start time of their transmission such that a propagation delay, which depends on the distance between transmitter T and receiver R, is compensated for. This may also include that a time gap is provided between transmitting subsequent symbols.

The method further comprises defining a convex search space including at least the components of the received signal vector y and of the transmit symbol vectors s for all symbols c of the constellation C, which is strongly biased towards the discrete constellation points by the regularizer (i.e., the third term of equation (4)), while incorporating the noise knowledge into the signal detection process unlike the other SotA discreteness-aware receivers including [6-12].

This noise awareness feature of the presented invention is the key advantage over the other SotAs, which is reached by introducing another regularization term such that the noise amplification can be sufficiently suppressed, which results in the presented invention as a generalization of the conventional linear minimum mean square error (LMMSE) for discrete inputs.

A receiver of a communication system has a processor, volatile and/or non-volatile memory and at least one interface adapted to receive a signal in a communication channel. The non-volatile memory may store computer program instructions which, when executed by the microprocessor, configure the receiver to implement one or more embodiments of the method in accordance with the invention. The volatile memory may store parameters and other data during operation. The processor may be called one of a controller, a microcontroller, a microprocessor, a microcomputer and the like. And, the processor may be implemented using hardware, firmware, software and/or any combinations thereof. In the implementation by hardware, the processor may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor or saved in the memory to be driven by the processor.

BRIEF DESCRIPTION OF THE DRAWINGS

Flow charts depicting disclosed methods comprise "processing blocks" or "steps" that may represent computer software instructions or groups of instructions. Alternatively, the processing blocks or steps may represent steps performed by functionally equivalent circuits, such as a digital signal processor (DSP), a field programmable gate array (FPGA), an application specific integrated circuit (ASIC), or a graphics processing unit (GPU) or a computer processing unit (CPU) programmed with software instructions to perform disclosed methods. It will be appreciated by those of ordinary skill in the art that unless otherwise indicated herein, a particular sequence of steps described is illustrative only and can be varied. Unless otherwise stated, the steps described herein are unordered, meaning that the steps can be performed in any convenient or desirable order.

The invention will be further explained with reference to the drawings.

DETAILED DESCRIPTION OF EMBODIMENTS

Figure 1:
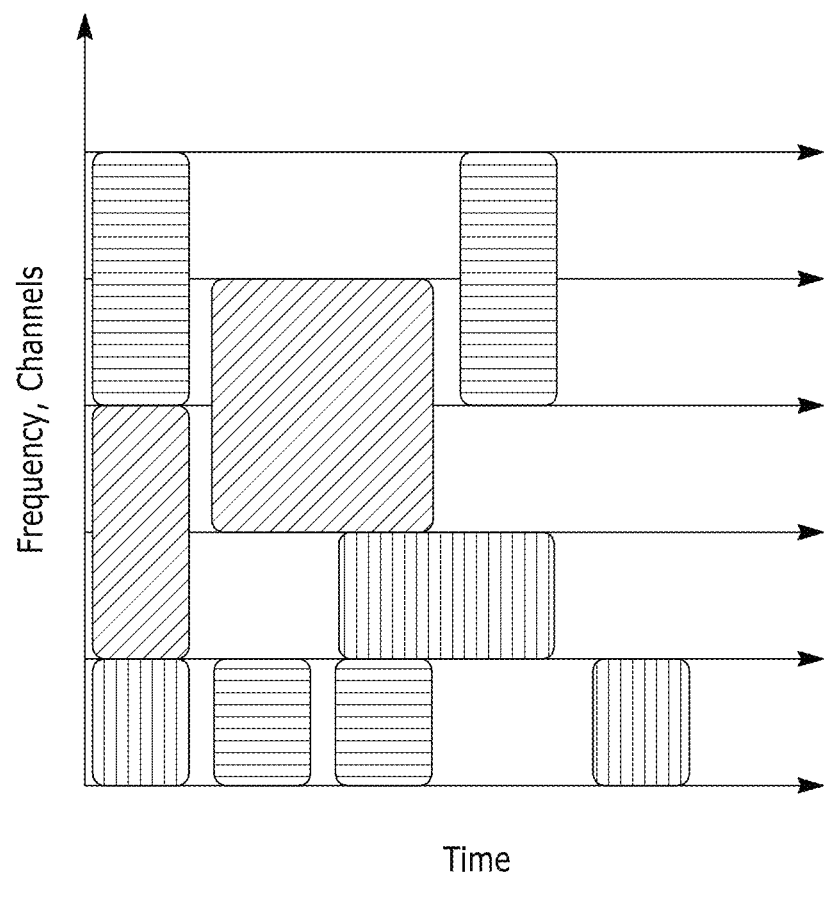
FIG. 1 shows a simplified schematic representation of orthogonal multiple access to a shared medium in accordance with the prior art.
Figure 2A:
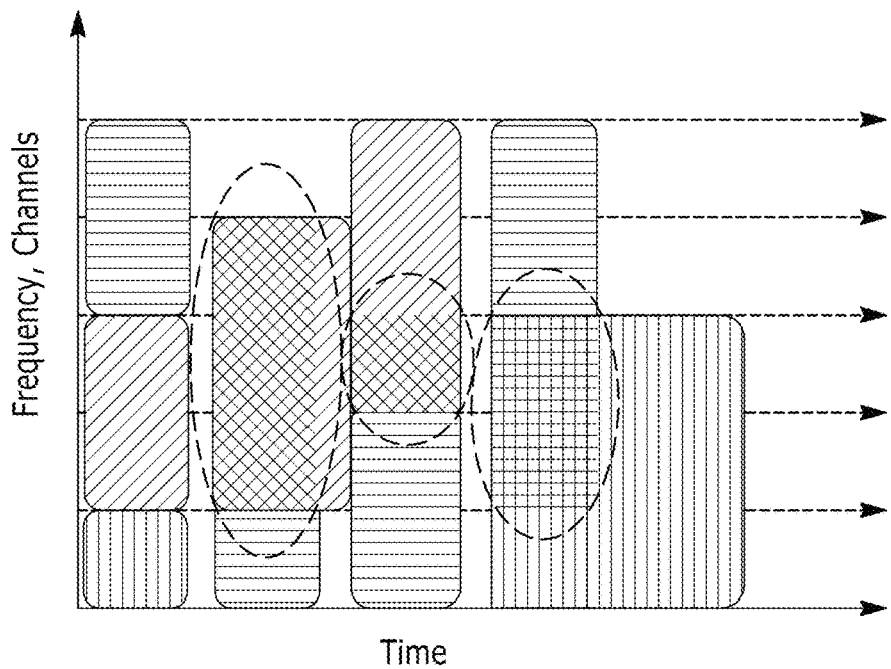
FIGS. 2a and 2b show a-simplified schematic representations of non-orthogonal multiple b-access to a shared medium in accordance with the prior art.
Figure 2B:
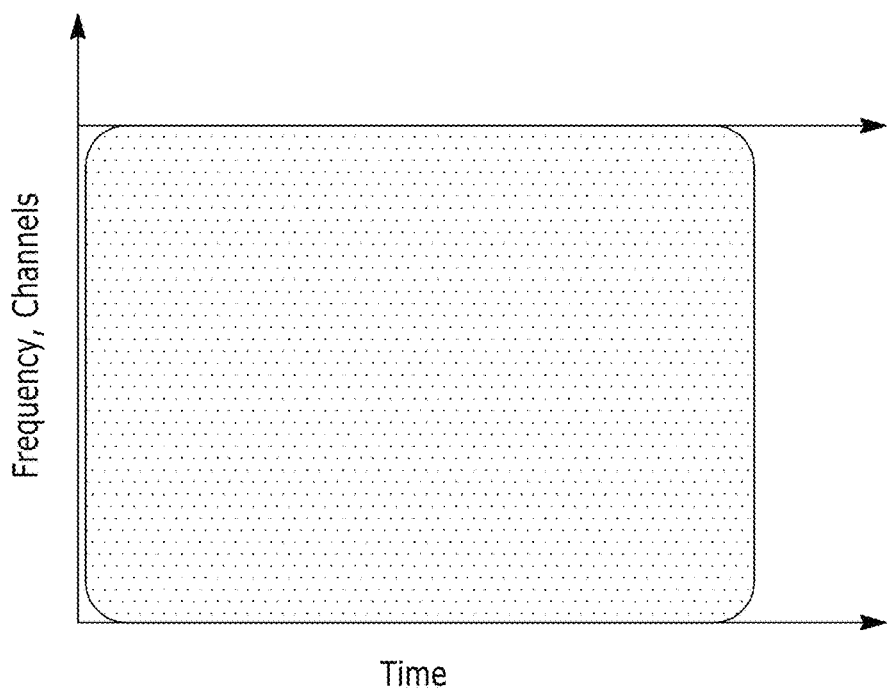

FIGS. 1 and 2 have been discussed further above and are not revisited here.

Figure 3:
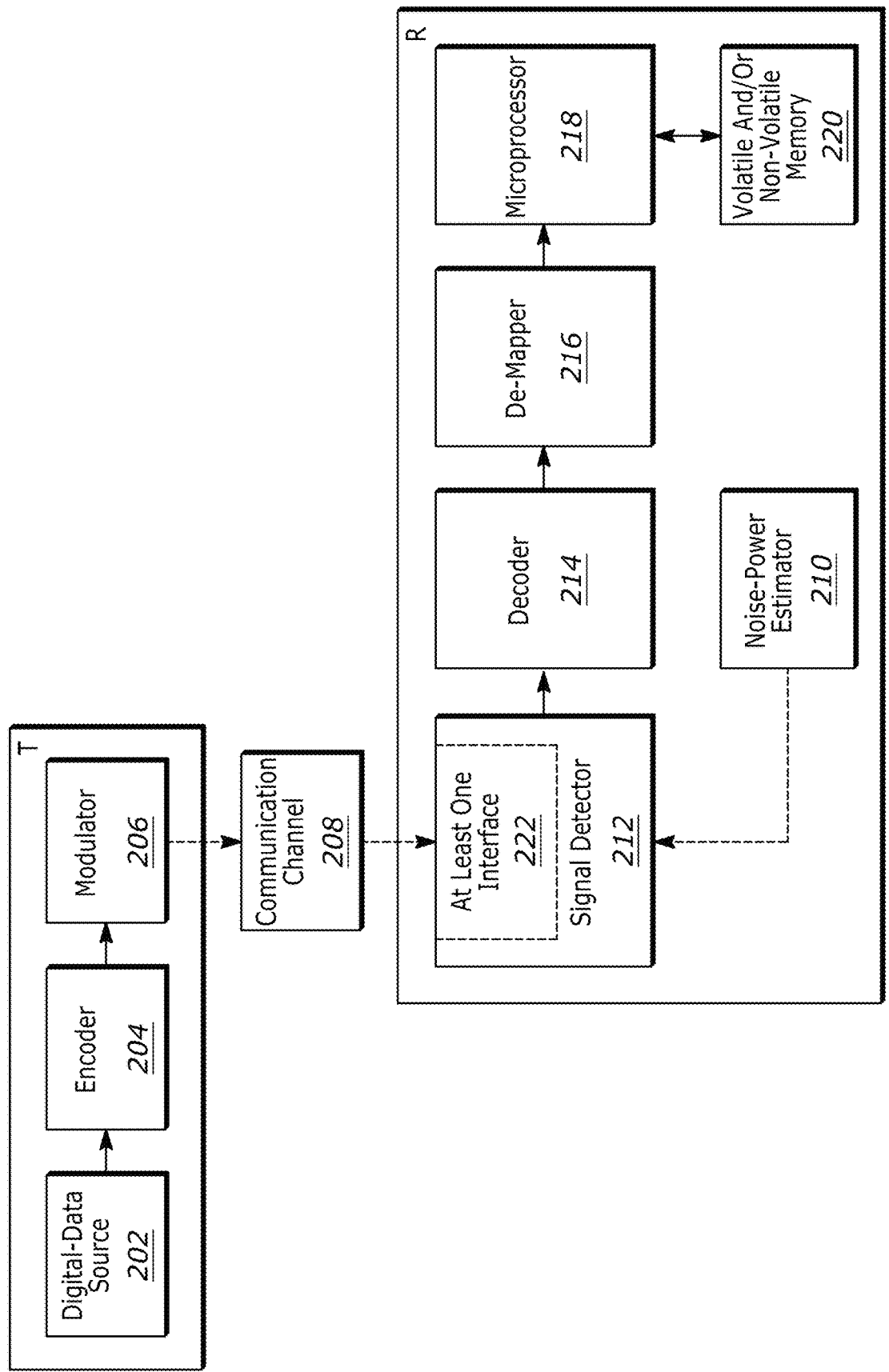
FIG. 3 shows an exemplary generalized block diagram of a transmitter and a receiver that communicate over a noisy communication channel.

FIG. 3 shows an exemplary generalized block diagram of a transmitter T and a receiver R that communicate over a communication channel 208. Transmitter T may include, inter alia, a source 202 of digital data that is to be transmitted. Source 202 provides the bits of the digital data to an encoder 204, which forwards the data bits encoded into symbols to a modulator 206. Modulator 206 transmits the modulated data into the communication channel 208, e.g. via one or more antennas or any other kind of signal emitter (not shown). The modulation may for example be a Quadrature Amplitude Modulation (QAM), in which symbols to be transmitted are represented by an amplitude and a phase of a transmitted signal.

Channel 208 may be a wireless channel. However, the generalized block diagram is valid for any type of channel, wired or wireless. In the context of the present invention the medium is a shared medium, i.e., multiple transmitters and receivers access the same medium and, more particularly, the channel is shared by multiple transmitters and receivers.

Receiver R receives the signal through communication channel 208, e.g. via one or more antennas or any other kind of signal receiver (not shown). Communication channel 208 may have introduced noise to the transmitted signal, and amplitude and phase of the signal may have been distorted by the channel. The distortion may be compensated for by an equalizer provided in the receiver (not shown) that is controlled based upon channel characteristics that may be obtained, e.g., through analysing pilot symbols with known properties transmitted over the communication channel. Likewise, noise may be reduced or removed by a filter in the receiver (not shown).

A signal detector 212 receives the signal from channel and noise-power estimator 210 tries to estimate the noise variance from series of the received signals the accumulate over previous transmissions. Signal detector 212 forwards the estimated signal to a decoder 214 that decodes the estimated signal into an estimated symbol. If the decoding produces a symbol that could probably have been transmitted it is forwarded to a de-mapper 216, which outputs the bit estimates corresponding to the estimated transmit signal and the corresponding estimated symbol, e.g. to a microprocessor 218 for further processing.

A signal detector 212 receives the signal from the channel and tries to estimate, from the received signal, which signal had been transmitted into the channel. At least one interface 222 may be part of, or separate from, signal detector 212. Signal detector 212 forwards the estimated signal to a decoder 214 that decodes the estimated signal into an estimated symbol. If the decoding produces a symbol that could probably have been transmitted it is forwarded to a de-mapper 216, which outputs the bit estimates corresponding to the estimated transmit signal and the corresponding estimated symbol, e.g., to a microprocessor 218 for further processing. Otherwise, if the decoding does not produce a symbol that is likely to have been transmitted, the unsuccessful attempt to decode the estimated signal into a probable symbol is fed back to the signal detector for repeating the signal estimation with different parameters. The processing of the data in the modulator of the transmitter and of the demodulator in the receiver are complementary to each other.

While the transmitter T and receiver R of FIG. 3 appear generally known, the receiver R, and more particularly the signal detector 212 and decoder 214 of the receiver in accordance with the invention are adapted to execute the inventive method described hereinafter and thus operate different than known signal detectors.

Figure 4:
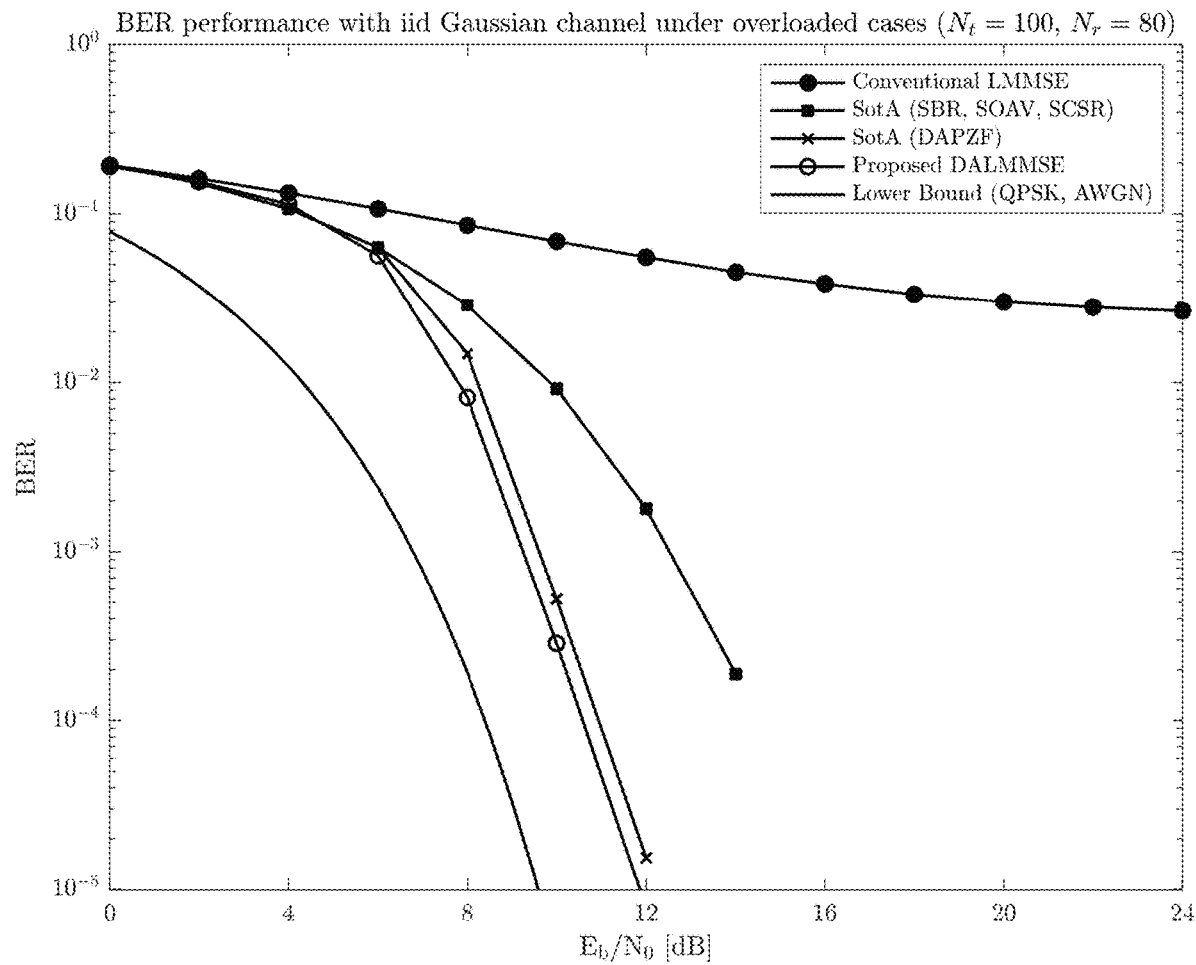
FIG. 4 is a graph depicting performance evaluation of the proposed noise-aware non-orthogonal multiple access, including comparison with previous/existing schemes.

FIG. 4 describes the performance evaluation in comparison with the state-of-the art receivers.

The proposed method, as shown in the FIG. 4, provides performance gain in terms of reliability (i.e., BER) without increasing complexity with respect to prior-art, particularly for the operation regime above 8 dB, which is of practical interest.

To realize 5G and Beyond 5G, various technologies are proposed, including Massive multiple-input multiple output (MIMO), Cooperative MIMO, millimeter wave (mmWave) communications, NOMA, device-to-device (D2D), proximity services (ProSe), mobile relays, airborne relays, software-defined networking, fog computing, and distributed Artificial Intelligence (AI). Many infrastructure functions can be pushed with the help of this proposed method to the network's edge to reduce latency, extend coverage, enhance versatility, and exploit the computational resources of the vast number of user devices. Mobile edge computing (MEC) can promptly process computationally intensive jobs offloaded from mobile devices, thus reducing end-to-end latency. Edge computing modules can be in a base transceiver stations, relay, or user equipment.

Aspects disclosed herein are broadly applicable to wireless standards and use case families disclosed herein, including (but not limited to) cellular, mobile broadband, vehicular ad-hoc networks, fixed broadband, Internet of Things (IoT), peer-to-peer networks, mesh networks, wireless personal area networks (WPANs), wireless local area networks (WLANs), wireless sensor networks, airborne networks, satellite networks, network fabrics, software-defined networks (SDNs), and hybrid networks.

The invention claimed is:

1. A computer-implemented reconstruction method of discrete digital signals in noisy overloaded wireless communication systems that is characterized by a channel matrix of complex coefficients, the method including
Receiving the signal from channel by a signal detector;
Measuring the noise power by a noise power estimator at the receiver;
Forwarding the detected signal and noise power estimation to a decoder that estimates the transmitted symbol-(s),
   wherein the estimation of the decoder produces a symbol that could have been transmitted and that is forwarded to a de-mapper, which outputs the bit estimates corresponding to the estimated transmit signal and the corresponding estimated symbol to a microprocessor for further processing; and
   wherein the decoder uses the noise power estimation explicitly within the decoding process in such a way that it minimizes the effect of noise amplification.

2. The method of claim 1, wherein minimizing the effect of noise amplification is done by directly considering the noise power measurement in the estimation of the transmit symbol.

3. The method of claim 1, wherein the minimizing the effect of noise amplification according to the minimization formulation via a first function, a second function, and a third function used to estimate the transmit signal(s)

$$\underset{s \in \mathbb{C}^{N_t}}{\operatorname{argmin}} \|y - Hs\|_2^2 + \sigma_n^2 \|s\|_2^2 + \lambda \sum_{i=1}^{2^b} \|s - c_i 1\|_0$$

wherein:
H is a channel matrix of complex coefficients;
$c_i$ is a set of discrete symbols, which form a constellation C of symbols;
$N_t$ and $N_r$ are dimensions, respectively, of input and output signals;
$H \in \mathbb{C}^{N_r \times N_t}$ is a measurement matrix between the input and output signals, a normalized input symbol vector consisting of elements sampled from a same constellation set $\mathcal{C} = \{c_1, \cdots c_{2^b}\}$ of cardinality 2b is described as $s = [s_1, \cdots s_{N_t}]^T \in \mathbb{C}^{N_t \times 1}$ with b denoting a number of bits per symbol;
$n \in \mathbb{C}^{N_r \times 1}$ represents an independent and identically distributed circular symmetric complex Additive White Gaussian Noise (AWGN) vector with zero mean and covariance matrix $$\frac{N_t}{\rho} I_{N_r},$$

where $\rho$ is a fundamental signal-to-noise-ratio (SNR);
y is a received signal vector;
s represents symbol vectors of symbols $c_i$ of the constellation $\mathcal{C}$;
$N_t$ is a number of transmitter antennas or ports;
$\lambda$ is a penalty parameter;
$\sigma$ is a standard deviation of the effective noise at the receiver;
$\sigma^2$ is a power or noise variance;
double-vertical lines on both sides means a Frobenius norm of a vector; and the first function, the second function, and the third function are terms, which are separated by the two "+" signs, in the minimization formulation.

4. The method of claim 3, wherein the fractional programming algorithm is targeted to find a value of the third function that is lower than the global minimum of the first function.

5. The method of claim 3, wherein the first function is a Euclidian distance function centered around the received signal's vector.

6. The method of claim 3, wherein the second function is the product of the estimated noise power and transmit signal power.

7. The method of claim 3, wherein the third function is a function based on or tightly approximating an $l_0$-norm.

8. A receiver of a communication system having a processor, volatile and/or non-volatile memory, at least one interface adapted to receive a signal in a communication channel, wherein the non-volatile memory stores computer program instructions which, when executed by the microprocessor, configure the receiver to implement reconstruction of discrete digital signals in noisy overloaded wireless communication systems that is characterized by a channel matrix of complex coefficients, by performing operations including Receiving the signal from channel by a signal detector Measuring the noise power by a noise power estimator at the receiver Forwarding the detected signal and noise power estimation to a decoder that estimates the transmitted symbol (s), wherein the estimation of the decoder produces a symbol that could have been transmitted and that is forwarded to a de-mapper, which outputs the bit estimates corresponding to the estimated transmit signal and the corresponding estimated symbol to a microprocessor for further processing; and wherein the decoder uses the noise power estimation explicitly within the decoding process in such a way that it minimizes the effect of noise amplification.

9. The receiver of claim 8, wherein minimizing the effect of noise amplification is done by directly considering the noise power measurement in the estimation of the transmit symbol.

10. The receiver of claim 8, wherein the minimizing the effect of noise amplification according to the minimization formulation via a first function, a second function, a third function used to estimate the transmit signal (s)

$$\underset{s \in \mathbb{C}^{N_t}}{\operatorname{argmin}} \|y - Hs\|_2^2 + \sigma_n^2 \|s\|_2^2 + \lambda \sum_{i=1}^{2^b} \|s - c_i 1\|_0$$

wherein:

H is a channel matrix of complex coefficients;

$c_i$ is a set of discrete symbols, which form a constellation C of symbols;

$N_t$ and $N_r$ are dimensions, respectively, of input and output signals;

$H \in \mathbb{C}^{N_r \times N_t}$ is a measurement matrix between the input and output signals, a normalized input symbol vector consisting of elements sampled from a same constellation set $\mathcal{C} = \{c_1, \cdots c_{2^b}\}$ of cardinality 2b is described as $s = [s_1 \cdots s_{N_t}]^T \in \mathbb{C}^{N_t \times 1}$ with b denoting a number of bits per symbol;

$n \in \mathbb{C}^{N_r \times 1}$ represents an independent and identically distributed circular symmetric complex Additive White Gaussian Noise (AWGN) vector with zero mean and covariance matrix $$\frac{N_t}{\rho} I_{N_r},$$

where ρ is a fundamental signal-to-noise-ratio (SNR);

y is a received signal vector;

s represents symbol vectors of symbols $c_i$ of the constellation C;

$N_t$ is a number of transmitter antennas or ports;

λ is a penalty parameter;

σ is a standard deviation of the effective noise at the receiver;

$\sigma^2$ is a power or noise variance;

double-vertical lines on both sides means a Frobenius norm of a vector; and the first function, the second function, and the third function are terms, which are separated by the two "+" signs, in the minimization formulation.

11. The receiver of claim 10, wherein the fractional programming algorithm is targeted to find a value of the third function that is lower than the global minimum of the first function.

12. The receiver of claim 10, wherein the first function is a Euclidian distance function centered around the received signal's vector.

13. The receiver of claim 10, wherein the second function is the product of the estimated noise power and transmit signal power.

14. The receiver of claim 10, wherein the third function is a function based on or tightly approximating an $l_0$-norm.

* * * * *